(12) United States Patent
Terada

(10) Patent No.: US 9,677,926 B2
(45) Date of Patent: Jun. 13, 2017

(54) LIQUID-LEVEL DETECTION DEVICE

(71) Applicant: DENSO CORPORATION, Kariya, Aichi-pref. (JP)

(72) Inventor: Yoshifumi Terada, Toyota (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/778,641

(22) PCT Filed: Mar. 13, 2014

(86) PCT No.: PCT/JP2014/001437
§ 371 (c)(1),
(2) Date: Sep. 21, 2015

(87) PCT Pub. No.: WO2014/156023
PCT Pub. Date: Oct. 2, 2014

(65) Prior Publication Data
US 2016/0047686 A1    Feb. 18, 2016

(30) Foreign Application Priority Data

Mar. 28, 2013 (JP) ................................. 2013-069336

(51) Int. Cl.
*G01F 23/32* (2006.01)
*G01F 23/38* (2006.01)

(52) U.S. Cl.
CPC ............ *G01F 23/32* (2013.01); *G01F 23/38* (2013.01)

(58) Field of Classification Search
CPC .................................. G01F 23/32; G01F 23/38
See application file for complete search history.

(56) References Cited

U.S. PATENT DOCUMENTS

| 6,595,239 B1 * | 7/2003 | Korst | ................... B60K 15/077 137/558 |
| 2005/0083045 A1 | 4/2005 | Miyagawa | |
| 2008/0072668 A1 | 3/2008 | Miyagawa | |

FOREIGN PATENT DOCUMENTS

| JP | S56170726 U | 12/1981 |
| JP | 2001124615 A | 5/2001 |

(Continued)

OTHER PUBLICATIONS

International Search Report and Written Opinion (in Japanese with English Translation) for PCT/JP2014/001437, mailed Apr. 15, 2014; ISA/JP.

*Primary Examiner* — Paul West
(74) *Attorney, Agent, or Firm* — Harness, Dickey & Pierce, P.L.C.

(57) ABSTRACT

A liquid-level detection device detects a level of a surface of liquid stored in a container. The liquid-level detection device includes: a float that floats on the surface of liquid; a rotatable body that rotates due to a upward or downward displacement of the float and includes a rotation contact part; a supporting body that rotatably supports the rotatable body and includes a supporting contact part which is located on a rotational track of the rotation contact part to restrict the rotation of the rotatable body in a specified direction by contact between the supporting contact part and the rotation contact part; and an attachment member that is attached to the supporting body and includes an attachment contact part which makes contact with the rotatable body rotating in the specified direction to prevent the contact of the rotation contact part with the supporting contact part.

7 Claims, 9 Drawing Sheets

(56) References Cited

FOREIGN PATENT DOCUMENTS

| | | | |
|---|---|---|---|
| JP | 2005265468 | A | 9/2005 |
| JP | 2006208212 | A | 8/2006 |
| JP | 2006220561 | A | 8/2006 |
| JP | 2007147510 | A | 6/2007 |
| JP | 2010164543 | A | 7/2010 |
| JP | 2010181244 | A | 8/2010 |

* cited by examiner

LIQUID-LEVEL DETECTION DEVICE

CROSS REFERENCE TO RELATED APPLICATIONS

This application is a U.S. National Phase Application under 35 U.S.C. 371 of International Application No. PCT/JP2014/001437 filed on Mar. 13, 2014 and published in Japanese as WO 2014/156023 A1 on Oct. 2, 2014. This application is based on and claims the benefit of priority from Japanese Patent Application No. 2013-069336 filed on Mar. 28, 2013. The entire disclosures of all of the above applications are incorporated herein by reference.

TECHNICAL FIELD

The present disclosure relates to a liquid-level detection device that detects a surface level of liquid stored in a container.

BACKGROUND ART

Conventionally, as disclosed in Patent Document 1, for example, there is known a liquid-level detection device including a float that floats on a surface of liquid, a float arm and an arm holder that rotate due to the vertical movement of the float, and a sensor frame that rotatably supports the arm holder. In such a liquid-level detection device, the sensor frame is provided with a stopper surface. The stopper surface is located on a rotational track of a stopper engagement part provided for the float arm, and is in contact with the stopper engagement part to restrict the rotation of the arm holder.

In addition, three pairs of the stopper surfaces formed in a stepped manner along the axial direction of the stopper engagement part are provided for the sensor frame of Patent Document 1. As a result of such a configuration, by adjusting the length of the stopper engagement part, a rotatable range of the arm holder can be changed to any of the previously-specified three steps corresponding to the shape of a container.

PRIOR ART DOCUMENT

Patent Document

Patent Document 1: JP2001-124615A

In Patent Document 1, although the rotatable range of the arm holder can be adjusted to any of the three steps, a difference between the respective rotatable ranges for settings is not small. Accordingly, the rotatable range of the arm holder may not correspond accurately to the shape of the container. In this case, to realize an appropriate rotatable range, the shape of the arm holder or the sensor frame, for example may preferably be changed.

However, a rotatable body such as the arm holder and a supporting body such as the sensor frame are generally shared by several types of liquid-level detection devices configured to correspond to containers having various shapes. Thus, it is substantially impossible to change the shape of a core component such as the rotatable body or the supporting body to correspond to the shape of a particular container.

SUMMARY OF INVENTION

The present disclosure addresses the above issues Thus, it is an objective of the present disclosure to provide a liquid-level detection device that can set arbitrarily a rotatable range of a rotatable body to correspond to a shape of a container with a shape of a core component maintained.

To achieve the objective of the present disclosure, in a first aspect of the present disclosure, a liquid-level detection device for detecting a level of a surface of liquid stored in a container, includes: a float that floats on the surface of liquid; a rotatable body that rotates due to an upward or downward displacement of the float and includes a rotation contact part; a supporting body that rotatably supports the rotatable body and includes a supporting contact part which is located on a rotational track of the rotation contact part to restrict the rotation of the rotatable body in a specified direction by contact between the supporting contact part and the rotation contact part; and an attachment member that is attached to the supporting body and includes an attachment contact part which makes contact with the rotatable body rotating in the specified direction to prevent the contact of the rotation contact part with the supporting contact part.

Accordingly, the attachment contact part of the attachment member attached to the supporting body makes contact with the rotatable body to prevent the contact of the rotation contact part with the supporting contact part. Thus, the rotatable body rotating in the specified direction comes into contact with the attachment contact part prior to bringing the rotation contact part into contact with the supporting contact part located on the rotational track of the rotation contact part. As a result, a rotatable range of the rotatable body is narrowed. According to the above-described configuration, by adjusting the shape and arrangement of the attachment contact part which is provided for the attachment member, the rotatable range of the rotatable body can be set arbitrarily corresponding to the shape of the container with the shape of a core component such as the supporting body maintained.

In a second aspect of the present disclosure, a liquid-level detection device for detecting a level of a surface of liquid stored in a container includes: a float that floats on the surface of liquid; a rotatable body that rotates due to an upward or downward displacement of the float and includes a rotation contact part; a supporting body that rotatably supports the rotatable body and includes a rotation restricting means which is located on a rotational track of the rotation contact part for restricting the rotation of the rotatable body in a specified direction by contact between the rotation restricting means and the rotation contact part; and an attachment member that is attached to the supporting body and includes a contact preventing means which makes contact with the rotatable body rotating in the specified direction for preventing the contact of the rotation contact part with the supporting contact part.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
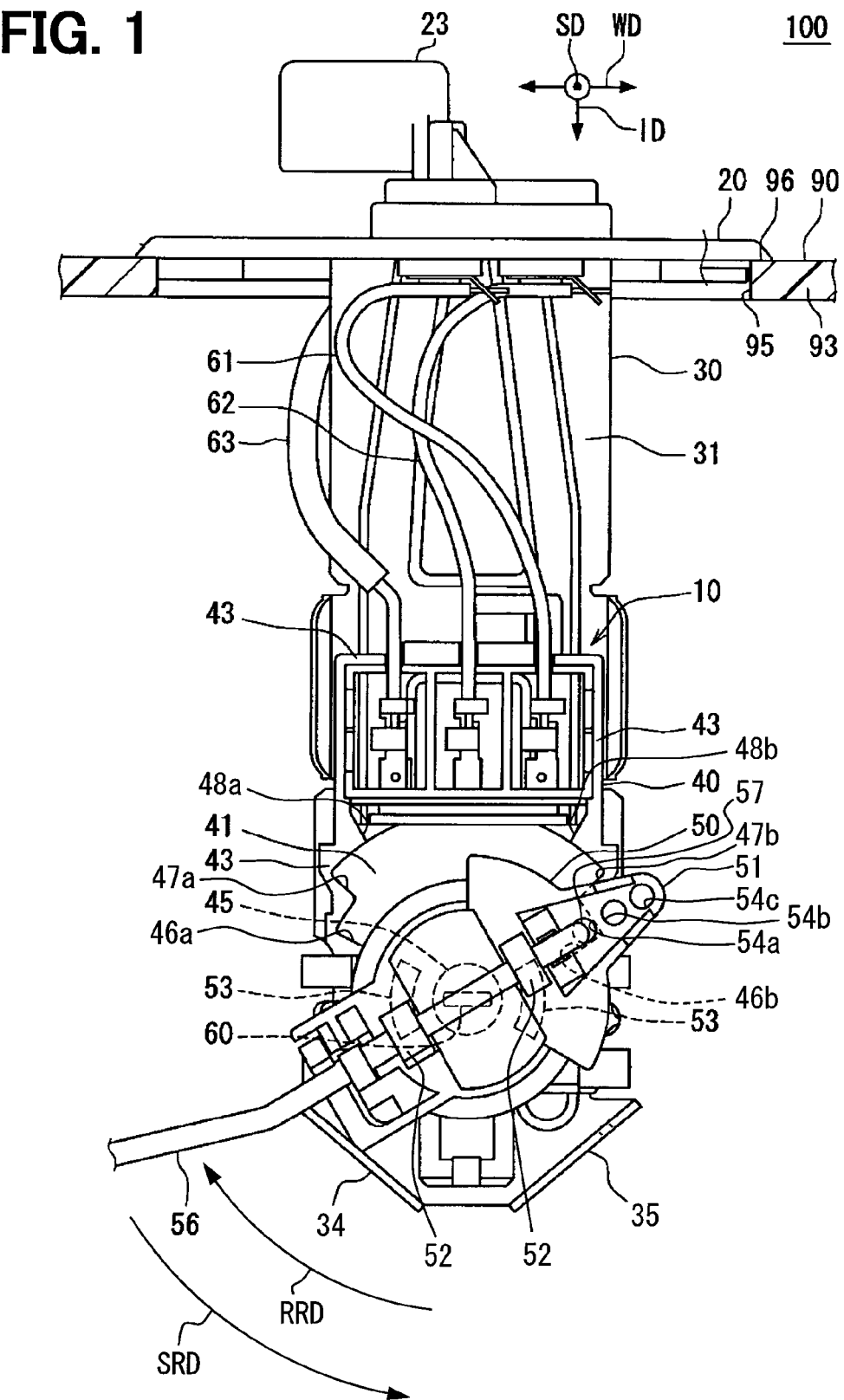
FIG. 1 is a front view illustrating a liquid-level detection module in accordance with a first embodiment.

Embodiments will be described below with reference to the drawings. Using the same reference numeral for corresponding components throughout the embodiments, a repeated description may be omitted. In a case of description of only a part of configuration in each embodiment, a configuration in another embodiment explained ahead of the embodiment can be applied to the other part of the configuration. In addition to a combination of the configurations indicated in the descriptions of the embodiments, the configurations in the embodiments can be partially combined together even without explanation thereof as long as this combination functions. A combination between configurations described in embodiments and modifications, although not expressly provided, may also be disclosed by the following explanation.

First Embodiment

A liquid-level detection module 100 of a first embodiment illustrated in FIG. 1 is disposed in a vehicle, and is placed in a fuel tank 90 that stores fuel as liquid. The configuration of the liquid-level detection module 100 will be described.

The liquid-level detection module 100 includes a fuel sender 10, a cover body 20 attached to the fuel tank 90, and a holder plate 30 to which the fuel sender 10 is attached. In the following description, the axial direction of an opening 95 which is provided at a top part 93 of the tank 90 to insert the liquid-level detection module 100 into the fuel tank 90 is referred to as an insertion direction ID of the liquid-level detection module 100. A direction that is substantially perpendicular to the insertion direction ID and is along the direction of a flat surface of the holder plate 30 is referred to as a width direction WD. A direction that is substantially perpendicular to the insertion direction ID and is along a thickness direction of the holder plate 30 is referred to as a thickness direction SD.

Figure 2:
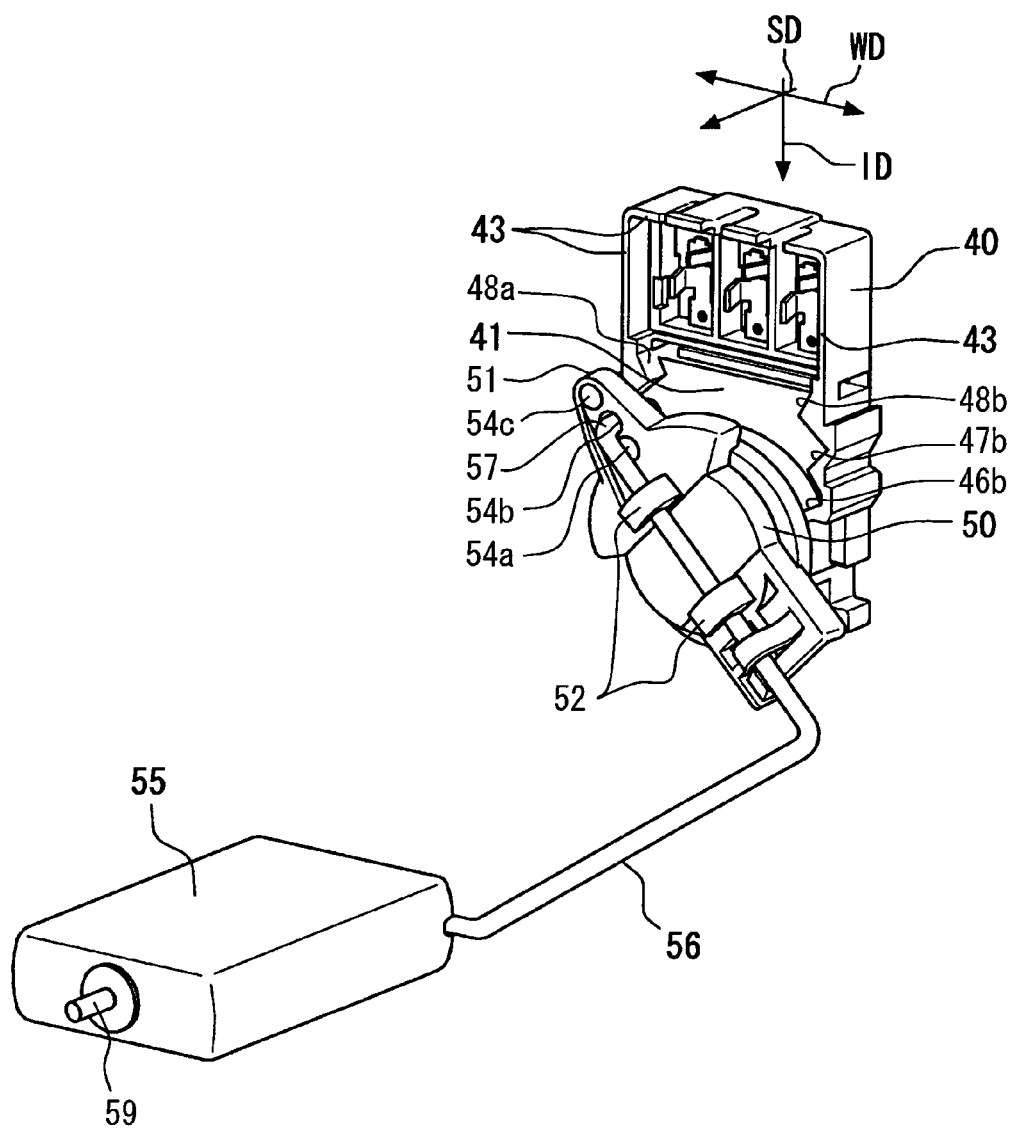
FIG. 2 is a perspective view illustrating a fuel sender according to the first embodiment.

The fuel sender 10 illustrated in FIGS. 1 and 2 detects a liquid surface level of fuel stored in the fuel tank 90. The fuel sender 10 includes a float 55, a float arm 56, a magnet holder 50, a body 40, and a Hall IC 60.

The float 55 is formed from a material having a smaller specific gravity than fuel, such as foamed ebonite. The float 55 can float on a fuel surface. The float 55 is supported by the magnet holder 50 via the float arm 56.

The float arm 56 is formed of a round bar-shaped core material made of a metallic material such as stainless steel. A float holding part 59 is formed at a float 55-side end portion of both ends of the float arm 56. The float holding part 59 is inserted through a through hole of the float 55, so that the float arm 56 holds the float 55. An arm contact part 57 is formed at a magnet holder 50-side end portion of the float arm 56. The arm contact part 57 is formed by bending the float arm 56 by about 90 degrees in the same direction as a rotation shaft of the magnet holder 50 and toward the body 40.

The magnet holder 50 is formed in a disc-shape from, for example, polyacetal (POM) resin. A magnet 53 is accommodated in the magnet holder 50. A flange part 51, stopper holes 54a to 54c, an arm engagement part 52, and so forth, are provided for the magnet 53.

The magnet 53 is a permanent magnet. The magnet 53 is formed in a curved-plate shape along a circumferential direction of the magnet holder 50. The pair of magnets 53 are arranged with a supporting shaft 45 (hereinafter described) of the body 40 therebetween. The magnet 53 rotates relative to the body 40 integrally with the magnet holder 50.

The flange part 51 is a flange-shaped part provided at the magnet holder 50. The stopper holes 54a to 54c are formed at the flange part 51. The stopper holes 54a to 54c pass through the flange part 51 along an axial direction of the magnet holder 50. The stopper holes 54a to 54c are arranged side by side at regular intervals along a radial direction of the magnet holder 50.

The arm engagement part 52 is a pawl part for engaging the float arm 56. The arm engagement part 52 extends out from an axial end surface of the magnet holder 50 in contact with the float arm 56. By engaging the float arm 56 with the arm engagement part 52 with the arm contact part 57 inserted through any one of the stopper holes 54a to 54c, the float arm 56 is fixed to the magnet holder 50.

The body 40 is formed from, for example, polyphenylene sulfide (PPS) resin. The body 40 is attached to the holder plate 30 to be held by the holder plate 30. The body 40 includes a bottom wall portion 41, the supporting shaft 45, and a peripheral wall portion 43. The bottom wall portion 41 is formed in a plate-shape and is mounted on the holder plate 30. The supporting shaft 45 projects cylindrically along the thickness direction SD from the bottom wall portion 41. The Hall IC 60 is accommodated in the supporting shaft 45 A bearing part of the magnet holder 50 is fitted around the supporting shaft 45, so that the body 40 rotatably supports the magnet holder 50.

The peripheral wall portion 43 is provided to rise from a peripheral edge part of the bottom wall portion 41 toward the magnet holder 50 along the thickness direction SD. Pairs of stopper surfaces 46a to 48b are formed on two wall surfaces of the peripheral wall portion 43 opposed to each other in the width direction WD. The stopper surfaces 46a to 48b extend respectively along the radial direction of the magnet holder 50. Among the three pairs of stopper surfaces, the wide-angle stopper surfaces 46a, 46b which are the closest to the supporting shaft 45 are located on a rotational track of the arm contact part 57 which is inserted through the stopper hole 54a. The intermediate stopper surfaces 47a, 47b are located at the positions shifted outward of the wide-angle stopper surfaces 46a, 46b in the radial direction of the magnet holder 50. The intermediate stopper surfaces 47a, 47b are located on the rotational track of the arm contact part 57 which is inserted through the stopper hole 54b. The narrow-angle stopper surfaces 48a, 48b are located at the positions shifted outward of the intermediate stopper surfaces 47a, 47b in the radial direction of the magnet holder 50. The narrow-angle stopper surfaces 48a, 48b are located on the rotational track of the arm contact part 57 which is inserted through the stopper hole 54c.

Each of the above-described stopper surfaces 46a to 48b restricts the rotation of the magnet holder 50 by its contact with the arm contact part 57. Specifically, each of the stopper surfaces 46a, 47a, 48a provided on one wall surface of the peripheral wall portion 43 comes into contact with the arm contact part 57 as a result of the rotation of the magnet holder 50 in a rotation direction to lower the float 55 (hereinafter referred to as a "specified direction SRD"). Accordingly, each of the stopper surfaces 46a, 47a, 48a limits the rotational displacement of the magnet holder 50 in the specified direction SRD to prevent the contact of the float 55 with a bottom surface of the fuel tank 90 in a state where the remaining amount of fuel in the fuel tank 90 is very small. Each of the stopper surfaces 46b, 47b, 48b provided on the other wall surface of the peripheral wall portion 43 comes into contact with the arm contact part 57 as a result of the rotation of the magnet holder 50 in a rotation direction to lift the float 55 (hereinafter referred to as a "reverse direction RRD"). Accordingly, each of the stopper surfaces 46b, 47b, 48b limits the rotational displacement of the magnet holder 50 in the reverse direction RRD to prevent the contact of the float 55 with a ceiling surface of the fuel tank 90 in a state where the fuel tank 90 is filled up with the largest amount of fuel.

The Hall IC 60 is a detection element for detecting the liquid surface level. The Hall IC 60 detects a rotation angle of the magnet holder 50 relative to the supporting shaft 45. The Hall IC 60 is disposed in the supporting shaft 45 to be located between the pair of magnets 53. The Hall IC 60 is connected to a device outside the fuel tank 90 via three lead wires 61 to 63, a terminal, and so forth. When the influence of a magnetic field is exerted from the outside on the Hall IC 60 in a state where a voltage is applied to the Hall IC 60, the Hall IC 60 outputs a voltage in proportion to the density of magnetic flux passing through the Hall IC 60 to the external device as an output result.

According to the above-described configuration, by the float arm 56 supported by the magnet holder 50, the reciprocating motion of the float 55 which is displaced upward or downward in accordance with the fuel is converted into the rotational motion to be transmitted to the integrated element including the float arm 56 and the magnet holder 50. Thus, the magnet holder 50 rotates relative to the body 40 in accordance with the liquid surface of fuel stored in the fuel tank 90. As a result of this relative rotation of the magnet holder 50, the magnetic flux density of the magnetic field applied to the Hall IC 60 changes, and the voltage outputted from the Hall IC 60 thereby changes. In this manner, the fuel sender 10 realizes the detection of the rotation angle of the magnet holder 50, eventually, the liquid surface level of fuel.

The cover body 20 illustrated in FIG. 1 is formed in a disc-shape having a diameter larger than the opening 95 from, for example, a resin material. The cover body 20 is liquid-tightly closely-attached to a peripheral edge part 96 of the opening 95 from the outside of the fuel tank 90 to block the opening 95. A counterpart connector part (not shown) for electrically connecting together the Hall IC 60 and the external device is fitted to a connector part 23 which is provided for the cover body 20.

Figure 3:
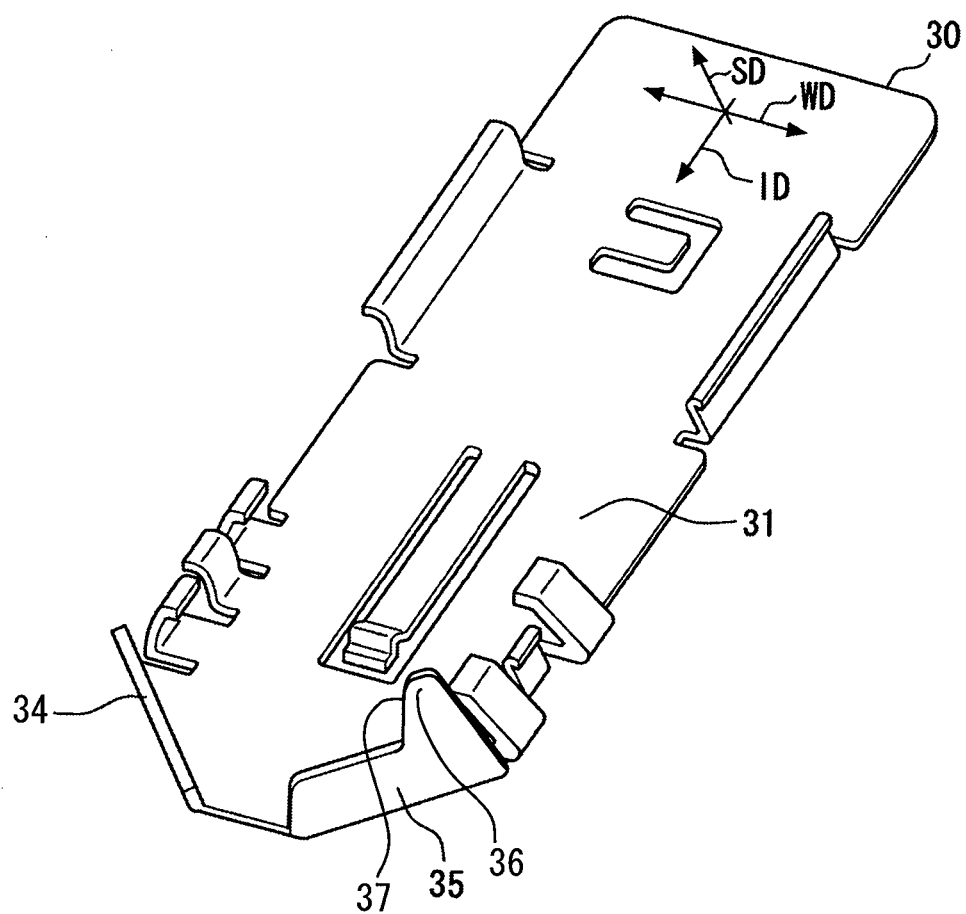
FIG. 3 is a perspective view illustrating a holder plate according to the first embodiment.

The holder plate 30 illustrated in FIGS. 1 and 3 is a member for fixing the body 40 of the fuel sender 10 to the fuel tank 90. The holder plate 30 holds the body 40, and is held by the cover body 20. The holder plate 30 is formed of a plate material which is made from a metallic material such as iron. The holder plate 30 includes a holder main body part 31 and guard walls 34, 35.

The holder main body part 31 is formed into a longitudinal shape with the insertion direction ID as its longitudinal direction. The holder main body part 31 extends from the cover body 20 along the insertion direction ID. The holder main body part 31 is located on an opposite side of the body 40 from the magnet holder 50. The holder main body part 31 supports each of the guard walls 34, 35.

The guard walls 34, 35 are provided to rise in a plate-shape from the end portion of the holder main body part 31 in the insertion direction ID toward the body 40 along the thickness direction SD. The pair of guard walls 34, 35 are opposed to each other in the width direction WD. In the insertion direction ID, each of the guard walls 34, 35 is inclined toward the center of the holder main body part 31 in the width direction WD.

In the above-described fuel sender 10 illustrated in FIG. 1, by changing the stopper holes 54a to 54c through which the arm contact part 57 is inserted, the position of the arm contact part 57 in the radial direction of the magnet holder 50 can be changed. As a result of this position change of the arm contact part 57, a rotatable range of the magnet holder 50 (hereinafter referred to as an "oscillating angle") can be adjusted. In the following description, the position of the arm contact part 57 that is inserted through the stopper hole 54a on the innermost circumference side is referred to as a wide-angle position. The position of the arm contact part 57 that is inserted through the stopper hole 54c on the outermost circumference side is referred to as a narrow-angle position. The position of the arm contact part 57 that is inserted through the stopper hole 54b is referred to as an intermediate position.

Specifically, the arm contact part 57 arranged at the wide-angle position has its displacement in the circumferential direction restricted by the wide-angle stopper surfaces 46a, 46b. In this case, the oscillating angle of the magnet holder 50 becomes the largest, i.e., approximately 120 degrees. The arm contact part 57 arranged at the intermediate position has its displacement in the circumferential direction restricted by the intermediate stopper surfaces 47a, 47b. In this case, the oscillating angle of the magnet holder 50 is approximately 90 degrees. The arm contact part 57 arranged at the narrow-angle position has its displacement in the circumferential direction restricted by the narrow-angle stopper surfaces 48a, 48b. In this case, the oscillating angle of the magnet holder 50 is approximately 60 degrees.

Figure 4:
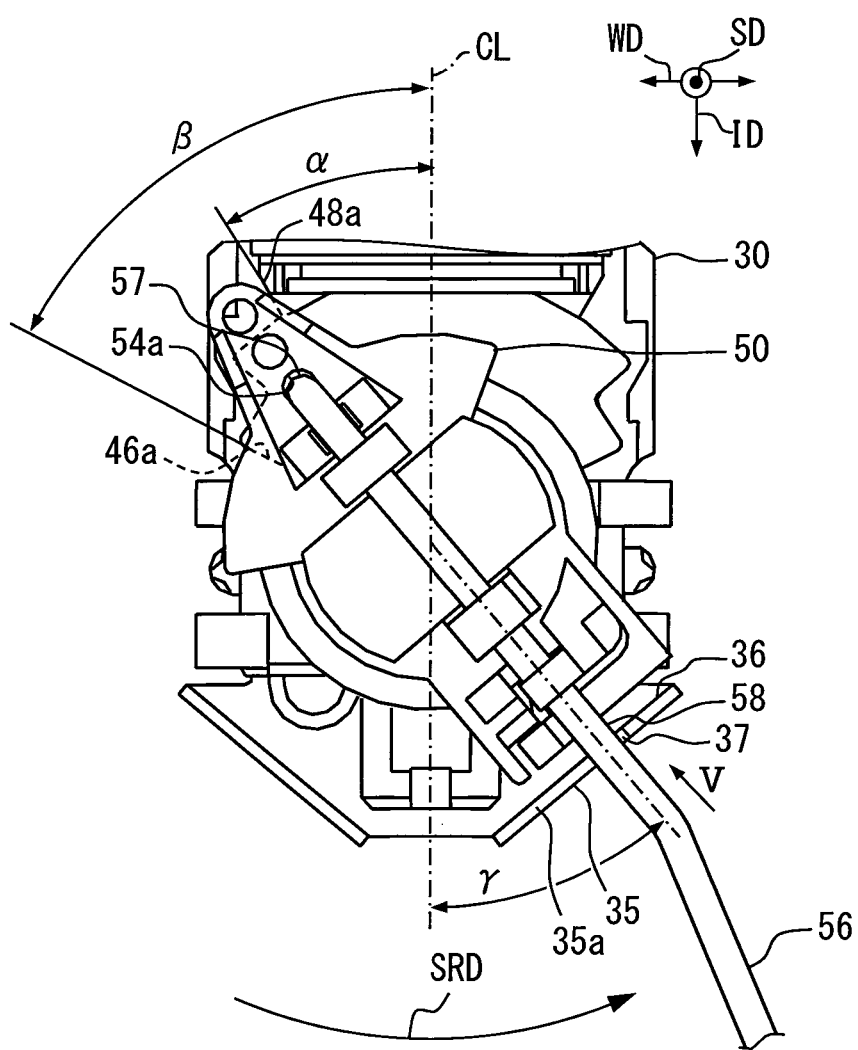
FIG. 4 is a diagram illustrating a function of a holder stopper part that restricts an oscillating angle of a magnet holder according to the first embodiment.

As described above, in the fuel sender 10, the oscillating angle of the magnet holder 50 is adjustable to any of the three steps. However, a difference between the respective oscillating angles for settings is not small. For this reason, the oscillating angle may not correspond correctly to the shape of the fuel tank 90. Accordingly, as illustrated in FIGS. 3 and 4, the holder plate 30 is provided with a holder stopper part 36.

The holder stopper part 36 is provided to rise from a top portion 35a of one guard wall 35 in the thickness direction SD. The holder stopper part 36 is formed integrally with the guard wall 35. The holder stopper part 36 is formed in a plate-shape that is continuous with the guard wall 35, and is disposed with its thickness direction toward the rotation center of the magnet holder 50. An outer edge portion 37 of the edge of the holder stopper part 36 that is located inward in the width direction WD is inclined in the circumferential direction of the magnet holder 50, and extends in the axial direction of this holder 50.

It is assumed that the imaginary line, which is along the insertion direction ID and passes through the rotation center of the magnet holder 50, is a central line CL. On the imaginary plane perpendicular to the thickness direction SD, it is assumed that the angle made between the central line CL, and the imaginary line from the rotation center to the wide-angle stopper surface 46a in the specified direction SRD is β. It is assumed that the angle made between the central line CL, and the imaginary line from the rotation center to the narrow-angle stopper surface 48a in the specified direction SRD is α. It is assumed that the angle made between the central line CL, and the imaginary line from the rotation center to the outer edge portion 37 in the specified direction SRD is γ. The angle γ which defines the position of the outer edge portion 37 is set to be larger than the angle α which defines the position of the narrow-angle stopper surface 48a, and to be smaller than the angle β which defines the position of the wide-angle stopper surface 46a.

According to the configuration explained above, the case of the arm contact part 57 arranged at the wide-angle position will be described first. In such an application mode, when the magnet holder 50 rotates in the specified direction SRD, the float arm 56 brings an intermediate part 58 into contact with the outer edge portion 37 before bringing the arm contact part 57 into contact with the wide-angle stopper surface 46a. In this manner, the holder stopper part 36 prevents the arm contact part 57 from coming into contact with the wide-angle stopper surface 46a by its contact with the float arm 56. Accordingly, the oscillating angle of the magnet holder 50 is narrowed compared with the case where the holder plate 30 does not include the holder stopper part 36.

Figure 5:
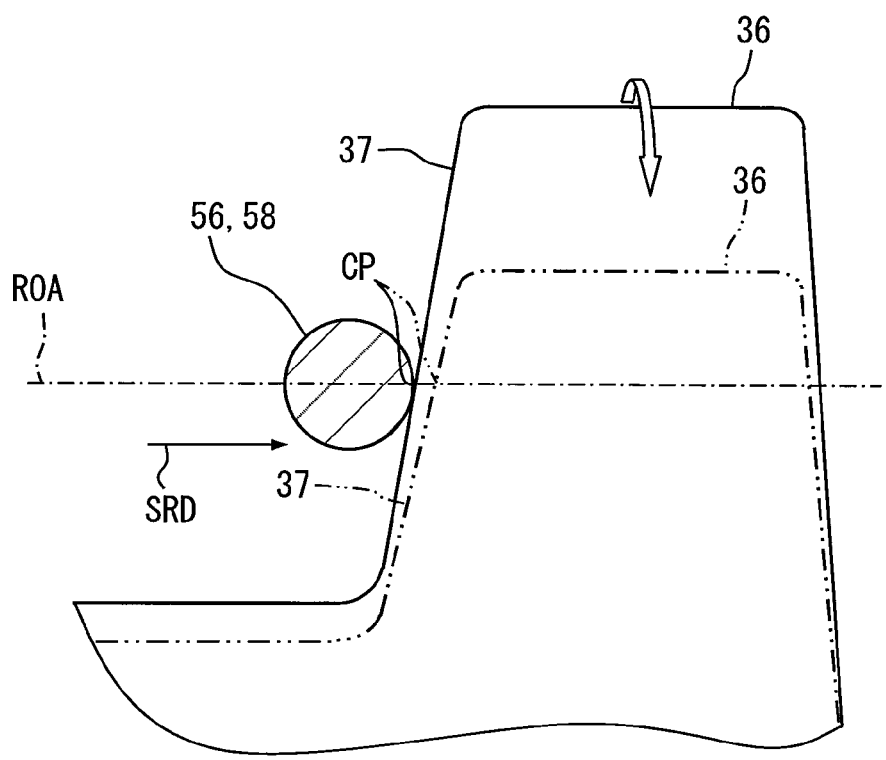
FIG. 5 is an enlarged view of the holder stopper part viewed from an arrow V in FIG. 4, illustrating displacement of a contact position by folding down the holder stopper part.

Moreover, provided that the outer edge portion 37 has a shape inclined in the circumferential direction as illustrated in FIG. 5, by folding down the holder stopper part 36 radially outward along its thickness direction, the intersection point between a rotational track ROA of the float arm 56 and the outer edge portion 37 moves at least in the specified direction SRD. In this manner, the contact position CP between the outer edge portion 37 and the intermediate part 58 is shifted slightly in the specified direction SRD. Accordingly, fine adjustment of the oscillating angle can be made.

Figure 6:
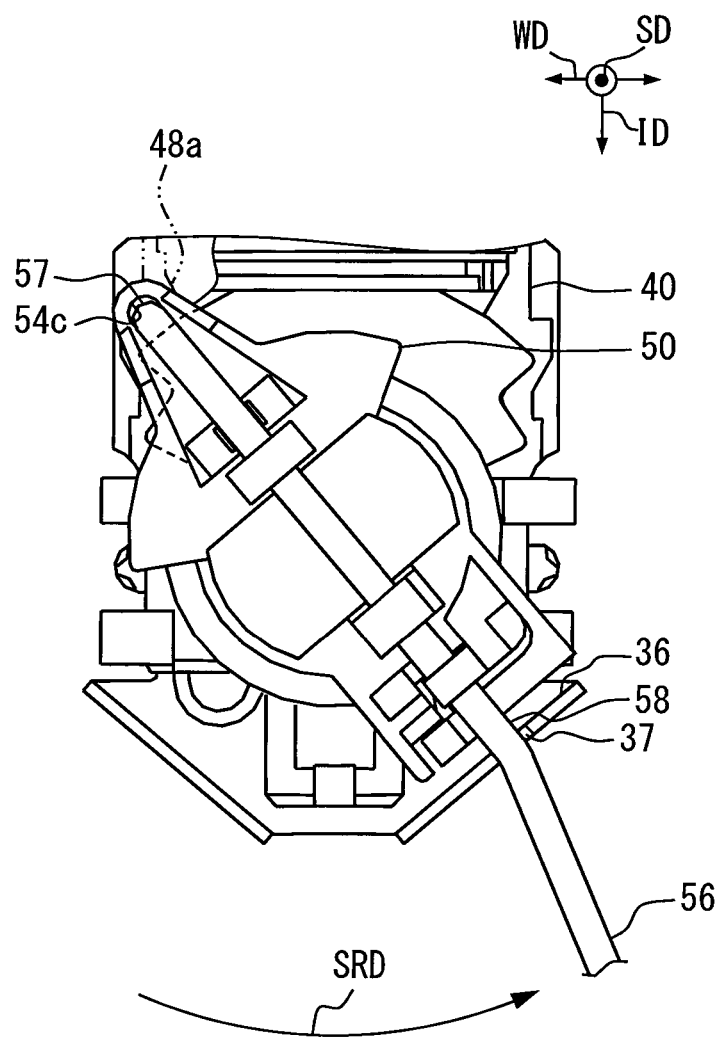
FIG. 6 is a diagram illustrating a function of the holder stopper part that prevents disengagement of an arm contact part from a body in the first embodiment.

Next, as illustrated in FIG. 6, the case of the arm contact part 57 arranged at the narrow-angle position will be described. In such an application mode, when the magnet holder 50 rotates in the specified direction SRD, the float arm 56 normally brings the arm contact part 57 into contact with the narrow-angle stopper surface 48a. Thus, the intermediate part 58 and the outer edge portion 37 are not brought into contact with each other. However, if the narrow-angle stopper surface 48a is accidentally damaged, the arm contact part 57 may be displaced beyond the narrow-angle stopper surface 48a in the specified direction SRD. In this case, the holder stopper part 36 can make its the outer edge portion 37 come into contact with the intermediate part 58. Accordingly, the rotation of the magnet holder 50 in the specified direction SRD is restricted. As a result, separation of the arm contact part 57 from the body 40 is prevented.

In the first embodiment described above, by the holder stopper part 36 restricting the rotation of the magnet holder 50, the oscillating angle can be provided without relying on the wide-angle stopper surface 46a of the body 40. Accordingly, by adjusting the shape, arrangement, and so forth of the holder stopper part 36, the oscillating angle can be set arbitrarily corresponding to the shape of the fuel tank 90 with the shape of the core component such as the body 40 maintained.

In the first embodiment, the holder plate 30 is formed from a metallic material. Accordingly, the holder stopper part 36 and its vicinity can be plastically deformed without reducing the strength of the holder stopper part 36. By such a plastic deformation, fine adjustment of the contact position CP between the outer edge portion 37 and the intermediate part 58 becomes possible, as described above. As a result, the oscillating angle of the magnet holder 50 can be adapt finely to the shape of the fuel tank 90 to which the liquid-level detection module 100 is actually attached.

As a result of the shape of the outer edge portion 37 that is inclined in the circumferential direction, by the plastic deformation whereby to fold down the holder stopper part 36 in its thickness direction, the contact position CP between the outer edge portion 37 and the intermediate part 58 can be shifted in the specified direction SRD. Accordingly, the fine adjustment of the oscillating angle corresponding to the actual shape of the fuel tank 90 can be made reliably and easily.

Furthermore, the intermediate part 58 of the first embodiment is brought into contact with the outer edge portion 37 of the plate-shaped holder stopper part 36 along the plate surface direction. Thus, the holder stopper part 36 can receive the force of the magnet holder 50 rotating in the specified direction SRD mainly in the plate surface direction. As a result of such a configuration, the holder stopper part 36 easily secures its strength necessary to restrict the rotation of the magnet holder 50. Accordingly, the oscillating angle of the magnet holder 50 provided by the holder stopper part 36 can be maintained over a long period.

Moreover, in the first embodiment, even if the arm contact part 57 that is inserted through the stopper hole 54c moves beyond the damaged narrow-angle stopper surface 48a, the rotational displacement of the magnet holder 50 in the specified direction SRD is limited by the contact of the intermediate part 58 with the outer edge portion 37. Because the detachment of the float arm 56 from the body 40 is thereby prevented, the state in which the oscillating angle is defined can be maintained. Therefore, even if the narrow-angle stopper surface 48a is accidentally damaged, the fuel sender 10 can continue the operation for detecting the liquid surface level.

Additionally, in the first embodiment, the above-described holder stopper part 36 is provided for the holder plate 30 for fixing the body 40 to the fuel tank 90. As a result of such a configuration, addition of a separate part for defining the oscillating angle becomes unnecessary. Accordingly, the oscillating angle can be set arbitrarily without complication of the configuration of the fuel sender 10.

In the first embodiment, the wide-angle position that is set by the stopper hole 54a may correspond to a "first position", and the narrow-angle position that is set by the stopper hole 54c may correspond to a "second position". The holder plate 30 may correspond to an "attachment member", and the holder stopper part 36 may correspond to an "attachment contact part" or a "contact preventing means". The body 40 may correspond to a "supporting body", the wide-angle stopper surface 46a may correspond to a "supporting contact part", a "first supporting contact part", or a "rotation restricting means", and the narrow-angle stopper surface 48a may correspond to a "second supporting contact part" or a "second rotation restricting means". The magnet holder 50 and the float arm 56 may correspond to a "rotatable body", and the arm contact part 57 may correspond to a "rotation contact part". The fuel tank 90 may correspond to a "container", and the liquid-level detection module 100 may correspond to a "liquid-level detection device".

Second Embodiment

Figure 7:
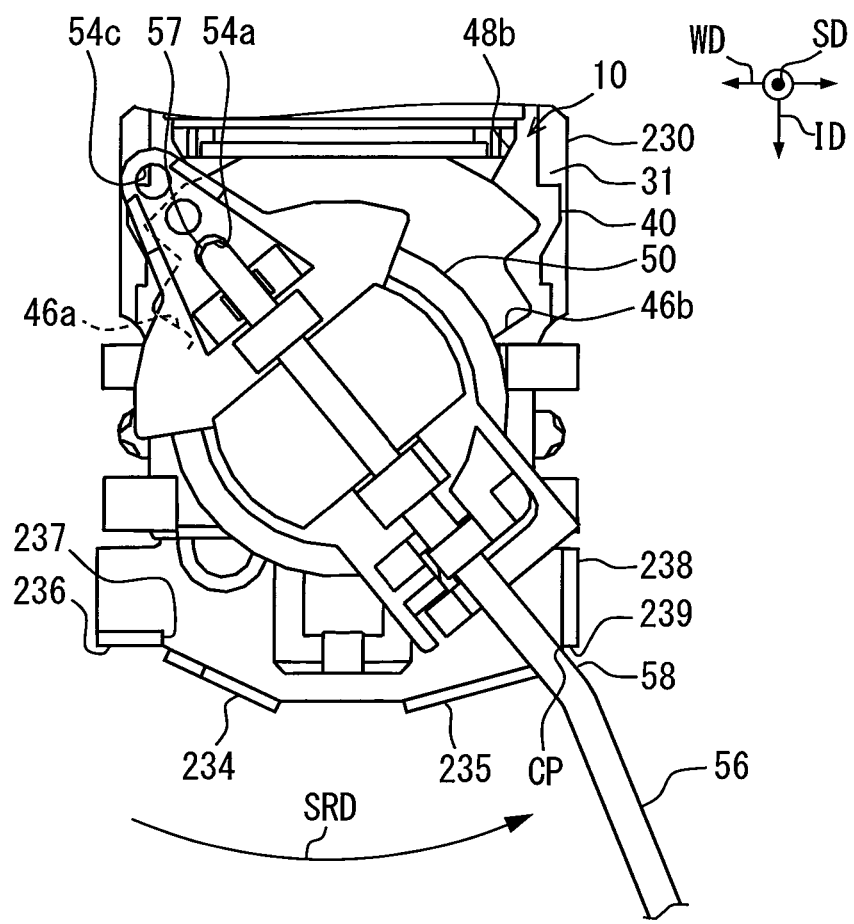
FIG. 7 is a diagram illustrating a state in which a magnet holder is rotated in a specified direction in a liquid-level detection module in accordance with a second embodiment.
Figure 8:
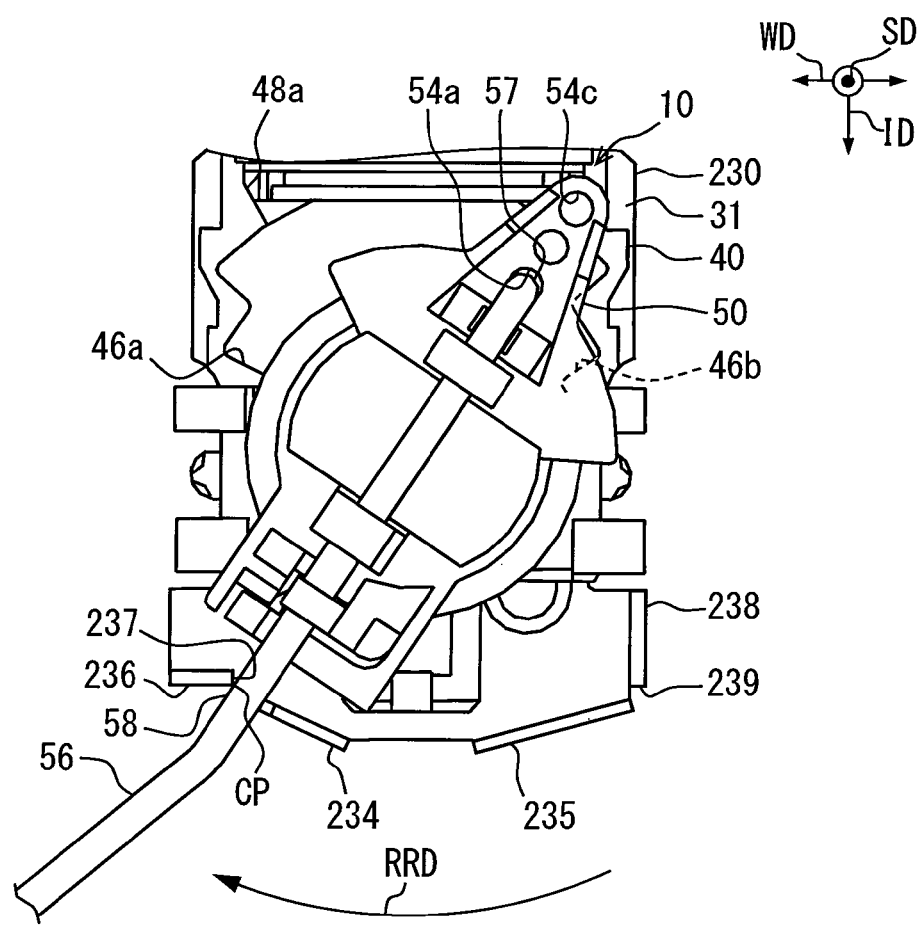
FIG. 8 is a diagram illustrating a state in which the magnet holder is rotated in a reverse direction in the liquid-level detection module of the second embodiment.

A second embodiment illustrated in FIGS. 7 and 8 is a modification to the first embodiment. A holder plate 230 of the second embodiment includes guard walls 234, 235 corresponding to the guard walls 34, 35 (see FIG. 3) of the first embodiment, a first stopper wall 236, and a second stopper wall 238. The first stopper wall 236 and the second stopper wall 238 of the holder plate 230 of the second embodiment will be described in detail below.

The first stopper wall 236 and the second stopper wall 238 are provided to rise from the edge portion of a holder main body part 31 in the thickness direction SD. The first stopper wall 236 is located outward of the guard wall 234 in the width direction WD. The first stopper wall 236 is provided to extend in a plate-shape along the width direction WD. An outer edge portion 237 of the edge of the first stopper wall 236 that is located inward in the width direction WD extends along the axial direction of a magnet holder 50.

The second stopper wall 238 is located outward of the guard wall 235 in the width direction WD. The second stopper wall 238 is provided to extend in a plate-shape along the insertion direction ID. An outer edge portion 239 of the edge of the second stopper wall 238 that is located in the insertion direction ID extends along the axial direction of the magnet holder 50.

According to the above-described configuration, in an application mode in which an arm contact part 57 is arranged at the wide-angle position, when the magnet holder 50 rotates in the specified direction SRD, a float arm 56 brings its intermediate part 58 into contact with the outer edge portion 239. In this manner, the second stopper wall 238 makes contact with the float arm 56 to prevent the contact of the arm contact part 57 with a wide-angle stopper surface 46a, thereby restricting the rotation of the magnet holder 50 in the specified direction SRD (see FIG. 7).

When the magnet holder 50 rotates in the reverse direction RRD, the float arm 56 brings its intermediate part 58 into contact with the outer edge portion 237. In this manner, the first stopper wall 236 makes contact with the float arm 56 to prevent the contact of the arm contact part 57 with a wide-angle stopper surface 46b, thereby restricting the rotation of the magnet holder 50 in the reverse direction RRD (see FIG. 8).

As described above, in the second embodiment as well, the oscillating angle of the holder plate 230 can be set without relying on the wide-angle stopper surfaces 46a, 46b of a body 40. Thus, with the shape of the core component such as the body 40 maintained, the oscillating angle can be set arbitrarily corresponding to the shape of a fuel tank 90 (see FIG. 1).

Moreover, in the second embodiment, the rotations of the magnet holder 50 in the specified direction SRD and in the reverse direction RRD are both limited respectively by the stopper walls 238, 236. Accordingly, the oscillating angle of the magnet holder 50 can be further freely defined by changing the shapes and arrangements of the stopper walls 236, 238 respectively. As a result, the oscillating angle can correspond to the shape of the fuel tank 90 (see FIG. 1) even more easily.

Furthermore, in the second embodiment, the imaginary axis that is provided from the center of the first stopper wall 236 along its thickness direction is directed in a direction deviated from the rotation center of the magnet holder 50. Similarly, the imaginary axis that is provided from the center of the second stopper wall 238 along its thickness direction is directed in a direction deviated from the rotation center of the magnet holder 50. As described above, when the respective thickness directions are directed in directions off the rotation center, the contact positions CP between the intermediate part 58 and the outer edge portions 237, 239 can respectively be shifted in the specified direction SRD or in the reverse direction RRD, by folding down the stopper walls 236, 238 along their respective thickness directions. Thus, by an easy process of slightly inclining the stopper walls 236, 238, the fine adjustment of the oscillating angle corresponding to the actual shape of the fuel tank 90 (see FIG. 1) can be reliably made.

In addition, in the second embodiment, in an application mode in which the arm contact part 57 is arranged at the narrow-angle position, if the arm contact part 57 rotates beyond a narrow-angle stopper surface 48a, the float arm 56 can bring its intermediate part 58 into contact with the outer edge portion 239. Similarly, if the arm contact part 57 that is inserted through a stopper hole 54c rotates beyond a narrow-angle stopper surface 48b, the float arm 56 can bring its intermediate part 58 into contact with the outer edge portion 237. Accordingly, even if the narrow-angle stopper surfaces 48a, 48b are damaged, the rotations of the magnet holder 50 in the specified direction SRD and in the reverse direction RRD are both restricted. As a result, the separation of the arm contact part 57 from the body 40 can be prevented. Thus, a fuel sender 10 can continue the operation for detecting the liquid surface level.

In the second embodiment, the holder plate 230 may correspond to the "attachment member", the second stopper wall 238 may correspond to the "attachment contact part" or the "contact preventing means", and the first stopper wall 236 may correspond to a "reverse side contact part" or a "reverse side rotation restricting means".

Third Embodiment

Figure 9:
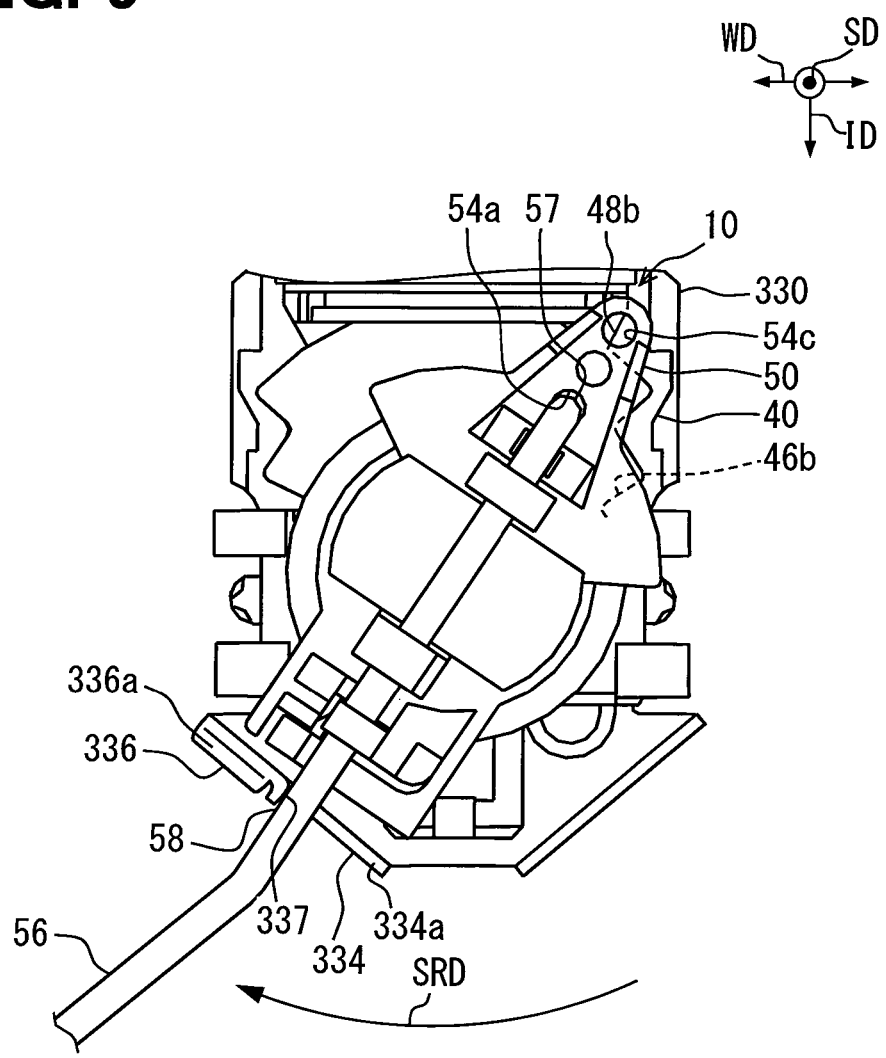
FIG. 9 is a diagram illustrating a state in which a magnet holder is rotated in a specified direction in a liquid-level detection module in accordance with a third embodiment.

A third embodiment illustrated in FIG. 9 is another modification to the first embodiment. A holder plate 330 of the third embodiment includes a holder stopper part 336 corresponding to the holder stopper part 36 (see FIG. 3) of the first embodiment. The holder stopper part 336 of the holder plate 330 of the third embodiment will be described in detail below. In the third embodiment, the rotation direction of a magnet holder 50 which lifts up a float 55 (see FIG. 1) is referred to as the specified direction SRD.

The holder stopper part 336 is formed integrally with a guard wall 334 that is substantially the same as the guard wall 34 (see FIG. 3) of the first embodiment, and has a plate-shape that is continuous with this guard wall 334. The holder stopper part 336 is provided to rise from a top portion 334a of the guard wall 334 in the thickness direction SD. The holder stopper part 336 is provided in a state where its thickness direction is directed toward the rotation center of the magnet holder 50. An outer edge portion 337 extending along the axial direction of the magnet holder 50 is formed inward of the holder stopper part 336 in the width direction WD. The outer edge portion 337 is bent outward in the radial direction of the magnet holder 50. A top portion 336a of the holder stopper part 336 is bent outward in the radial direction of the magnet holder 50. The holder stopper part 336 is reinforced by a rib that is constituted of the outer edge portion 337 and the top portion 336a.

According to the configuration explained above, in an application mode in which an arm contact part 57 is arranged at the wide-angle position, when the magnet holder 50 rotates in the specified direction SRD, a float arm 56 brings its intermediate part 58 into contact with the outer edge portion 337. Accordingly, the holder stopper part 336 can limit the rotation of the magnet holder 50 in the specified direction SRD. As a result, in the third embodiment as well, the oscillating angle of the magnet holder 50 can be provided without relying on a wide-angle stopper surface 46b of a body 40. Thus, the oscillating angle can be set arbitrarily corresponding to the shape of a fuel tank 90 (see FIG. 1) with the shape of the core component of a fuel sender 10 maintained.

Additionally, in the third embodiment, in an application mode in which the arm contact part 57 is arranged at the narrow-angle position, if the arm contact part 57 rotates beyond a narrow-angle stopper surface 48b, the float arm 56 can bring its intermediate part 58 into contact with the outer edge portion 337. Accordingly, even if the narrow-angle stopper surface 48b is damaged, the rotation of the magnet holder 50 in the specified direction SRD is limited. As a result, the disengagement of the arm contact part 57 from the body 40 is prevented, so that the fuel sender 10 can continue the operation for detecting the liquid surface level.

In the third embodiment, the holder plate 330 may correspond to the "attachment member", and the holder stopper part 336 may correspond to the "attachment contact part" or the "contact preventing means". The wide-angle stopper surface 46b may correspond to the "supporting contact part", the "first supporting contact part", or the "rotation restricting means". The narrow-angle stopper surface 48b may correspond to the "second supporting contact part" or the "second rotation restricting means".

Other Embodiments

The embodiments have been described above. The present disclosure is not interpreted by limiting to the above embodiments, and can be applied to various embodiments and their combination without departing from the scope of the disclosure.

In the above embodiments, the pairs of stopper surfaces 46a to 48b are provided for the body 40 to make adjustable the oscillating angle of the magnet holder 50. However, one pair of stopper surfaces may be provided for the body.

In an application mode in which the arm contact part is arranged at the intermediate position, the float arm may bring the intermediate part into contact with the holder stopper part before bringing the arm contact part into contact with the intermediate stopper surface. Alternatively, the float arm may bring the arm contact part into contact with the intermediate stopper surface before bringing the intermediate part into contact with the holder stopper part.

In the above first and second embodiments, the fine adjustment of the oscillating angle can be made by folding down the holder stopper part or each of the stopper walls in the thickness direction. When making such a fine adjustment of the oscillating angle, the direction in which the holder stopper part or each of the stopper walls is folded down may be inward of the magnet holder 50, or outward of the magnet holder 50.

In the above embodiments, the holder plate which holds the fuel sender 10 may correspond to the "attachment member" including the "attachment contact part". However, the "attachment member" is not limited to the holder plate. A dedicated stopper member including the "attachment contact part" such as the holder stopper part may be attached to the body as the "attachment member" separately from the holder plate. Furthermore, the material which is formed into the "attachment member" is not limited to a metallic material such as the holder plate, and may be changed appropriately.

Moreover, the direction of the rotation of the magnet holder that is restricted by the "attachment contact part", i.e., the specified direction SRD may be the rotation direction to lower the float as in the above first and second embodiments, or the rotation direction to lift the float as in the above third embodiment. In addition, the shape of the "attachment contact part" is not limited to a plate-shape as in the above embodiments, and may be changed appropriately. For example, the "attachment contact part" may have a columnar shape projecting from the holder main body part in the thickness direction SD.

The above embodiments illustrate a mode in which the fuel sender 10 eventually realizes the detection of the liquid surface level of fuel through the measurement of the rotation angle of the magnet holder 50 by the Hall IC 60. However, instead of the one of a magnetoelectric conversion method as in the above embodiments, the fuel sender may be, for example, a fuel sender of an electric resistance type that realizes the detection of the liquid surface level of fuel through measurement of an electric resistance value that increases or decreases due to the rotation of the rotatable body.

The present disclosure has been explained above based on the example of its application to the liquid-level detection module that detects the liquid surface level of fuel stored in the fuel tank 90 of the vehicle. However, the object that the present disclosure is applicable to is not limited to the detection of the liquid surface level of fuel. The present disclosure is applicable to a liquid-level detection device in a container for another liquid loaded onto the vehicle such as brake fluid, engine coolant, or engine oil. Additionally, the present disclosure may be applied to a liquid-level detection device in the containers provided for various consumer appliances or various transport machines instead of the fuel tank for the vehicle.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A liquid-level detection device for detecting a level of a surface of liquid stored in a container, comprising:
   a float that floats on the surface of liquid;
   a rotatable body that rotates due to an upward or downward displacement of the float and includes a rotation contact part;
   a supporting body that rotatably supports the rotatable body and includes a supporting contact part which is located on a rotational track of the rotation contact part to restrict the rotation of the rotatable body in a specified direction by contact between the supporting contact part and the rotation contact part; and
   an attachment member that is attached to the supporting body and includes an attachment contact part which makes contact with the rotatable body rotating in the specified direction to prevent the contact of the rotation contact part with the supporting contact part, wherein:
   a position of the rotation contact part of the rotatable body is capable of being chosen between a first position, and a second position that is shifted from the first position in a radial direction of the rotatable body;

the supporting body includes:

a first supporting contact part serving as the supporting contact part which is located on the rotational track of the rotation contact part arranged at the first position; and a second supporting contact part which is disposed to be shifted from the first supporting contact part and which is located on a rotational track of the rotation contact part arranged at the second position; and when the second supporting contact part is damaged, the rotation contact part arranged at the second position is displaced beyond the damaged second supporting contact part in the specified direction, so that the attachment contact part makes contact with the rotatable body.

2. The liquid-level detection device according to claim 1, wherein the attachment member is formed from a metallic material.

3. The liquid-level detection device according to claim 1, wherein:

the attachment contact part is formed in a plate-shape; and the attachment contact part makes its outer edge portion come into contact with the rotatable body rotating in the specified direction.

4. The liquid-level detection device according to claim 3, wherein the outer edge portion is inclined in a circumferential direction of the rotatable body, and extends in an axial direction of the rotatable body.

5. The liquid-level detection device according to claim 3, wherein a thickness direction of the attachment contact part is directed in a direction deviated from a rotation center of the rotatable body.

6. The liquid-level detection device according to claim 1, wherein the attachment member holds the supporting body to fix the supporting body relative to the container.

7. The liquid-level detection device according to claim 1, wherein the attachment member includes a reverse side contact part that makes contact with the rotatable body rotating in a reverse direction to the specified direction to restrict the rotation of the rotatable body in the reverse direction.

* * * * *